United States Patent

[11] 3,627,987

| [72] | Inventor | Calvin J. Holtkamp<br>Mansfield, Ohio |
|---|---|---|
| [21] | Appl. No. | 819,193 |
| [22] | Filed | Apr. 25, 1969 |
| [45] | Patented | Dec. 14, 1971 |
| [73] | Assignee | Westinghouse Electric Corporation<br>Pittsburgh, Pa. |

[54] CONTROL FOR COOKING APPARATUS
5 Claims, 5 Drawing Figs.

[52] U.S. Cl. .................................................. 219/511,
219/413, 337/104, 337/107
[51] Int. Cl. ................................................. H05b 1/02
[50] Field of Search.......................................... 219/511,
389, 412, 413, 414; 337/104, 107

[56] References Cited
UNITED STATES PATENTS
2,421,953  6/1947  MacKendrick................. 219/511 X

| 2,863,976 | 12/1958 | Dadson | 219/413 X |
|---|---|---|---|
| 3,125,659 | 3/1964 | Welch | 219/412 X |
| 2,384,372 | 9/1945 | Eaton | 337/104 |
| 2,571,360 | 10/1951 | Hallerberg | 337/104 |
| 2,993,976 | 7/1961 | Moore | 219/511 |
| 3,077,529 | 2/1963 | Schauer | 337/104 |

*Primary Examiner*—Bernard A. Gilheany
*Assistant Examiner*—F. E. Bell
*Attorneys*—F. H. Henson and E. C. Arenz ABSTRACT: Control apparatus including a thermal cycling switch especially useful in connection with a self-cleaning oven of the pyrolytic type in which a broil heating element in the oven is used both for broiling purposes and for producing heat for heat-cleaning purposes, the thermal cycling switch being arranged to cycle at more than one rate in accordance with the setting of a selector switch corresponding to the operation to be carried out in the oven.

PATENTED DEC14 1971  3,627,987

WITNESSES
Theodore F. Wrobel
James F. Young

INVENTOR
Calvin J. Holtkamp
BY Edward C. Chenz
ATTORNEY

CONTROL FOR COOKING APPARATUS

BACKGROUND OF THE INVENTION

1. Field of the Invention

The invention pertains to the art of thermal cycling switches for controlling heating rates.

2. Description of the Prior Art

Thermal cycling switches used to control the energization of an electric heater are well known as evidenced by Risacher et al. U.S. Pat. No. 2,813,173 which is one example of an adjustable cycling switch which may be used in connection with a range surface heating unit, for example.

The use of that general type of cycling switch in connection with a self-cleaning oven of the pyrolytic type for the purpose of controlling a heating element in the oven to maintain a surface temperature of the element in a range effective to eliminate gaseous products sweeping by the element, while the element also provides substantially all the heat elevate the temperature in the oven cavity to the heat cleaning temperature range, is disclosed and claimed in application Ser. No. 531,858.

Also, as disclosed and claimed in my U.S. Pat. No. 3,388,236, a thermal cycling switch may also be provided in connection with a surface heating unit in which any one of a plurality of resistance elements may be connected in the circuit to serve as a bypass to change, in effect, the calibration of the cycling switch.

While an arrangement embodied in a self-cleaning oven according to my noted patent application has generally performed satisfactorily, come problems have been experienced in high voltage areas in connection with broiling operations with the cycling switch out of the circuit. Specifically, the higher voltages cause the broiling element to provide a substantially greater heat output than its intended heat output, thereby producing substantial quantities of smoke and generally unsatisfactory broiling operations.

Thus, one aim of the invention is to provide an arrangement which will alleviate this problem by limiting the broil heater output to approximately its intended output under high voltage conditions.

SUMMARY OF THE INVENTION

In accordance with the invention and its application to a self-cleaning oven arrangement, the already available thermal cycling switch used for electrical current control in connection with a cleaning operation may be used with a modification and an electrical switching arrangement to provide current control also for a broiling operation to limit the broil heater wattage output under high-voltage conditions. In one form of the modified thermal cycling switch, two separate resistance heaters are provided in the main bimetal assembly package instead of a single resistance heater, and the selection of the proper average current for the particular oven operation to be carried out is accomplished through positioning the selector switch which establishes the operation.

The separate resistance heaters in the cycling switch may be arranged in various ways, and in accordance with the switching operation to accomplish the intended results.

DESCRIPTION OF THE PREFERRED EMBODIMENTS

Figure 1:
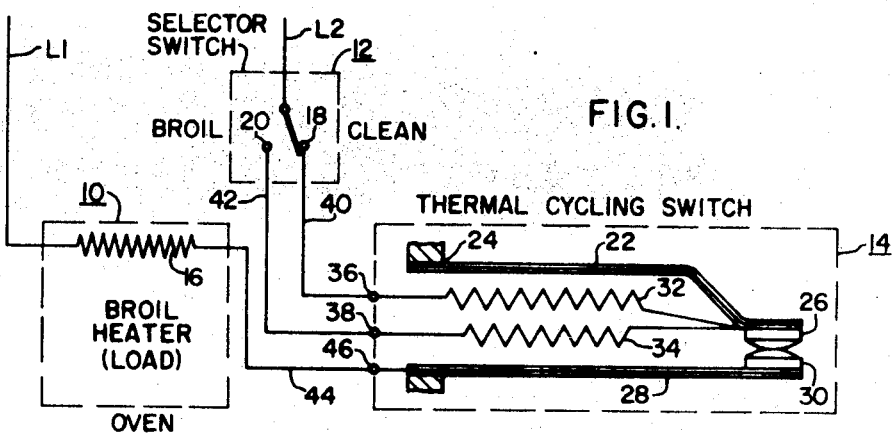
FIG. 1 is a simplified schematic diagram of a control arrangement according to the invention.

In the FIG. 1 schematic, dash line outlines are used to indicate the major parts of a system according to the invention and are identified by the numerals as follows: oven 10, selector switch 12, and thermal cycling switch 14. The oven heating element 16 serves as the broil heater as well as the heater which is energized during a heat-cleaning operation to produce substantially all of the heat for elevating the oven interior surfaces up into a fast heat cleaning range, and also providing heat for smoke elimination as the gaseous products produced by the heat-cleaning operation sweep by the surface of the heater. Further details on this arrangement for utilizing the broil heater for these purposes are to be found in Kastovich U.S. Pat. application Ser. No. 552,663, and my noted application Ser. No. 521,932.

The selector switch 12 corresponds to a part of an oven operation selector switch concerned with a broil operation, and a heat-cleaning operation. It will be understood that the oven selector switch as a whole includes a substantial number of terminals and contacts which are selectively connected depending upon the oven operation to be carried out. The contact 18 is the contact to which line L2 is connected for a clean operation, while the contact 20 is the one to which the line L2 is connected for a broil operation.

The thermal cycling switch 14 includes the main bimetal member 22 connected at end 24 to the switch casing for pivotal movement about the end, and carrying a contact 26 at its opposite end. A second compound bimetal arm 28, which will be considered in somewhat more detail hereafter, carries a contact 30 at its free end located to close and open with contact 26 on the main bimetal.

A first resistance heater strip 32, and a second resistance heater strip 34 each have one end connected to the bimetal carried contact 26, and opposite ends connected to the terminals 36 and 38 carried by the cycling switch casing. Line 40 connects selector switch contact 18 to the terminal 36 and line 42 connects contact 20 to terminal 38. Additionally, line 44 connects one end of the broil heater 16 to the terminal 46 to which the bimetal element 28 is electrically connected. The other side of the broil heater 16 is connected to line L1.

As noted before the schematic of FIG. 1 is of simplified form for purposes of describing the invention and it will be appreciated that in an actual oven control system as a whole numerous other components will be connected in the circuit. In this respect, reference should be had to the noted Kastovich patent application for more detailed information of an exemplary nature as the overall oven control circuit.

Figure 2:
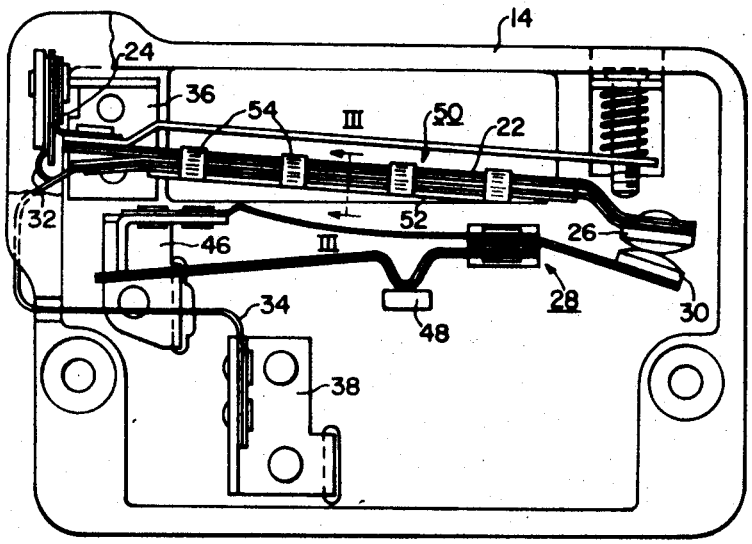
FIG. 2 is an elevational view of one form of thermal cycling switch according to the invention.

FIG. 2 shows one particular form, by way of example, that the thermal cycling switch may take. This particular form of the switch is based upon the form shown in the noted Risacher et al. patent, but with certain elements eliminated from the Risacher et al. structure since their functions are not required in a thermal cycling switch in an environment in which the invention is utilized. However, the main parts shown in FIG. 1 and identified by numeral have the same numerals applied to the main parts shown in FIG. 2. In that respect in it noted that the second bimetal member 28 depicted as a simple bimetal in FIG. 1 is of the more complicated form in FIG. 2 and includes a portion thereof which serves for ambient temperature composition and another portion thereof which serves an accelerating function. Details on that are to be found in the noted Risacher et al. patent. Another difference with respect to the structure shown in the Risacher et al. patent is that no adjusting element for compound bimetal member 28 of the character there shown is necessary since the thermal cycling switch is factory adjusted. Accordingly, the abutting element 48 fixed to the casing is utilized to bias the bimetal member 28 upwardly, and in the manufactured form this element 48 may be of an adjustable character to permit factory adjustment.

The main bimetal member 22 (FIGS. 2 and 3) is assembled into a sandwich-type package generally indicated by the numeral 50 which also includes the resistance heater strips 32 and 34 fed into the package at the secured end thereof from their respective terminal connections and electrically insulated from each other. A metallic strip 52 underlies the package as a whole and has a series of integral ears 54 which extend up along the edges of the package and are clamped over the top of the main bimetal member 22.

Figure 3:
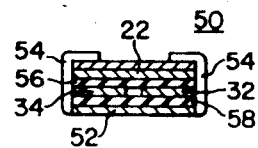
FIG. 3 is a sectional view corresponding to one taken along the line III—III of FIG. 2.

Referring now to FIG. 3, a transverse sectional view through the package shows the main bimetal member 22 on top, with the separate resistance heater strips 32 and 34 lying in a stratum of the package equidistant from the bimetal member 22 and separated therefrom by a mica insulating strip 56, and with the lower faces of the resistance heating strips separated from the metallic strip 52 by another mica strip 58.

In this arrangement and with the circuit arrangement shown in FIG. 1, the resistance heating strips 32 and 34 are of different resistances. The resistance of the strip 32 is slightly greater than the resistance of the strip 34 so that the additional heat produced and stored during the energization of the strip 32 will cause the bimetal member 22 to stay in its deflected position longer than is the case when strip 34 energized. Accordingly, the heat output of the element 16 in the oven will on the average be greater during a broiling operation than during a cleaning operation, although less than if element 16 were continuously energized. As an example of representative valves, if the broil heater 16 is rated 3800 watts when continuously energized across 236 volts, then the resistance heater strip 34 in the thermal cycling switch which is energized during broiling may be selected to provide heat at a rate that the thermal cycling switch cycles to produce an average 3,400 watt output of the oven heater 16. The strip 32 is selected to produce sufficient heat for a cleaning operation (e.g., in a typical self-cleaning oven with a solid door) which results in the broil heater being energized approximately 68 percent of the time to produce an average output of about 2,560 watts. Of course if the particular oven has a glass window in the door so that there is a greater heat loss, the resistance heater 32 is selected to cycle at a rate that the oven broil heater 16 produces about 2,900 watts average output during the cleaning operation.

Figure 4:
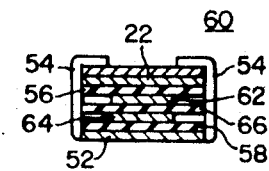
FIG. 4 is a sectional view similar to that of FIG. 3, but illustrating a different form of bimetal assembly sandwich.

In an alternate constriction of the bimetal assembly sandwich designated 60 in FIG. 4, and in which parts identical to those of FIG. 3 are identified by the same numerals, the resistance heater strips 62 and 64 are arranged in stacked relationship and separated by an additional electrically insulating mica strip 66. In this arrangement, the cyclic pattern obtained from the heater 62 nearest the main bimetal member 22 consists of shorter cycles compared to the cycles obtained from the heater 64 farther from the main bimetal because of the additional mass interposed between the heater farthest from the bimetal. The same switching arrangement as shown in FIG. 1 may be used for the FIG. 4 embodiment.

In still another alternate arrangement within the scope of the invention, the structural arrangement of FIG. 3 for the main bimetal assembly may be used but with the resistance heater strips 32 and 34 being of essentially the same resistance, and the switching arrangement being of a character so that in one operation only one of the resistance heaters is energized, while in the other switch position both of the heaters are energized in a parallel arrangement. In that arrangement, the cycling rate of the thermal cycling switch will of course vary in accordance with the difference in heat output of the two different switch positions. The further variant of this arrangement is to provide the resistance heater strips 32 and 34 of different resistances as in the original FIG. 3 description, and then provide a switching arrangement in which either of the resistance heater may be energized independently, and both may be energized while connected in parallel relationship so that a total of three different heat outputs are provided in accordance with the switch position.

Figure 5:
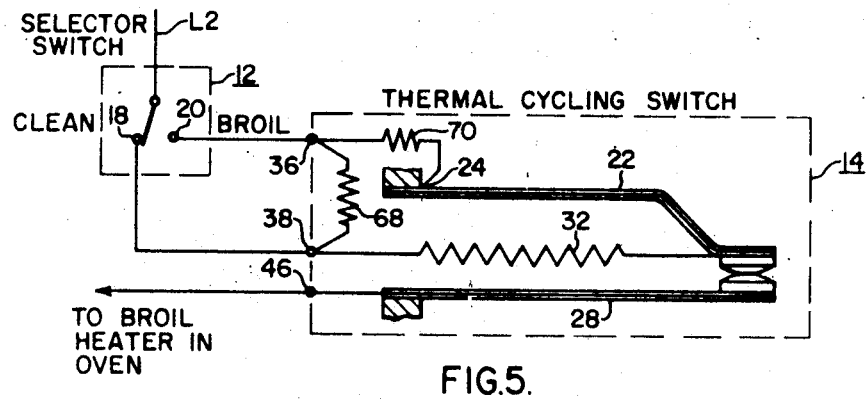
FIG. 5 is a simplified schematic diagram corresponding to a part of that shown in FIG. 1 and illustrating a modification.

In FIG. 5 another version of the thermal cycling switch is illustrated in which additional resistances are provided in the internal circuitry of the cycling switch, but in locations which the direct influence of these additional resistances is not exerted upon the main bimetal member 22. One resistance 68 of relatively low value is connected between the terminals 36 and 38 on the casing of the thermal cycling switch. Another resistance 70 is connected between terminal 36 and the supported end 24 of the main bimetal member 22. Thus in either switch position of the selector switch 12 the main resistance heater strip 32 is energized, but in parallel with other resistances to reduce the current flow through the strip 32. In the clean position of the selector switch, as shown in FIG. 5, it will be seen that the heater strip 32 is in parallel with the circuit including resistor 68, resistor 70, and the main bimetal element 22 itself. In the broil position of the selector switch, the resistance heater strip 32 in in series with the resistor 68, and together they are in parallel with the resistor 70 and the main bimetal 22. As one example, of values which may be used for the resistances in a self-cleaning oven designed for operation on 236 volts being provided with a solid (nonwindowed) oven door, the resistance heater strip 32 has a value of 0.032 ohms, the resistor 68 is 0.015 ohms, and the resistor 70 is 0.080 ohms. If the door is provided with a window in it so that the heat loss from the oven is somewhat greater, hen the value remain the same except that the resistor 68 is reduced to half its ohmic value. Of course it will be appreciated that if the oven is designed for operation on a different voltage such as 208 volts, then the resistance values are all proportionately changed.

I claim:

1. A pyrolytic self-cleaning oven including:
   an oven broil heater adapted to be energized at one time for a broiling operation producing heat at one rate, and at another time for a heat-cleaning oven operation producing heat at another rate;
   circuit means for effecting energization of said broil heater;
   thermal cycling switch means in said circuit means including a flexible bimetal member carrying a contact at one end for making and breaking said circuit means in accordance with the deflection of said bimetal, and resistance heater strip means in said circuit means and associated with said bimetal to produce said deflection in accordance with the bimetal temperature reflecting the energization of said resistance heater strip means;
   selector switch means in said circuit means having a clean position and a broil position; and
   means connected in said circuit means in both a clean and broil position of said selector switch means for energizing said resistance heater strip means in said thermal cycling switch to cause said thermal cycling switch to cyclically interrupt the circuit to said oven broil heater independently of the temperature produced in said oven, to produce an average heat output of said oven broil heater of less than the output of said oven broil heater produced under continuous energization.

2. In an oven according to claim 1 wherein:
   said resistance heater strip means includes first and said second resistance heater strips of different resistances to provide correspondingly different rates of heat output.

3. In an oven according to claim 2:
   said selector switch means in one of said positions connects at least one of said resistance heater strips in said circuit means alone, and in the other of said positions connects both of said resistance heater strips in said circuit in parallel 4. In an oven according to claim 1 wherein:
   said resistance heater strip means includes first and second resistance heater strips means includes first and second resistance heater strips spaced from said bimetal member different distances.

5. A pyrolytic self-cleaning oven including:
   an oven broil heater adapted to be energized at one time for a broiling operation, and at another time for an oven heat-cleaning operation;
   circuit means for effecting energization of said broil heater;
   thermal cycling switch means in said circuit means for providing a cyclical interruption of said circuit means;

oven operation selector switch means in said circuit means having a clean position and a broil position; and means in said circuit means for changing the rate at which said thermal cycling switch means operates in the one position of said selector switch means relative to the other position of said selector switch means, said thermal cycling switch being energized in both positions of said selector switch means to produce interruption of said circuit means, independently of the temperature produced in said oven, and accordingly a lower average rate of heat output of said oven heater than if said oven heater were continuously energized.

* * * * *